United States Patent
Mashimo et al.

(10) Patent No.: US 11,397,696 B2
(45) Date of Patent: Jul. 26, 2022

(54) DATA TRANSFER APPARATUS AND DATA TRANSFER METHOD

(71) Applicant: HITACHI ASTEMO, LTD., Hitachinaka (JP)

(72) Inventors: Daisuke Mashimo, Tokyo (JP); Taisuke Ueta, Tokyo (JP); Hideyuki Sakamoto, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/289,376

(22) PCT Filed: Oct. 29, 2019

(86) PCT No.: PCT/JP2019/042368
§ 371 (c)(1),
(2) Date: Apr. 28, 2021

(87) PCT Pub. No.: WO2020/105379
PCT Pub. Date: May 28, 2020

(65) Prior Publication Data
US 2021/0397568 A1 Dec. 23, 2021

(30) Foreign Application Priority Data
Nov. 22, 2018 (JP) .............................. JP2018-219662

(51) Int. Cl.
*G06F 13/16* (2006.01)
*H04L 12/40* (2006.01)

(52) U.S. Cl.
CPC .......... *G06F 13/1668* (2013.01); *H04L 12/40* (2013.01); *H04L 2012/40273* (2013.01)

(58) Field of Classification Search
CPC ................. G06F 13/1668; H04L 12/40; H04L 2012/40273
See application file for complete search history.

(56) References Cited

U.S. PATENT DOCUMENTS

| 2019/0084580 A1* | 3/2019 | Kodama | B60W 50/0205 |
| 2020/0021460 A1* | 1/2020 | Iwasaki | H01M 10/482 |
| 2020/0053003 A1 | 2/2020 | Shikata et al. | |

FOREIGN PATENT DOCUMENTS

| JP | 2015-000597 A | 1/2015 |
| JP | 2016-144172 A | 8/2016 |

(Continued)

OTHER PUBLICATIONS

English translation of JP-2016144172-A (Year: 2016).*
(Continued)

*Primary Examiner* — Henry Tsai
*Assistant Examiner* — John B Roche
(74) *Attorney, Agent, or Firm* — Volpe Koenig

(57) ABSTRACT

A data transfer apparatus includes an acquisition side communication port that receives data including an identifier indicating a classification from an outside, a distribution side communication port that transmits the data to the outside, a storage unit that stores transfer information in which the identifier and a condition related to a time of the data are associated, and a transfer processing unit that decides whether or not to transmit received data which is the data to the distribution side communication port based on the identifier included in the received data and information of the time of the received data, and the transfer information when the received data is received by the acquisition side communication port. The information of the time of the received data is a time at which the received data is received by the acquisition side communication port or a time included in the received data.

13 Claims, 15 Drawing Sheets

(56) References Cited

FOREIGN PATENT DOCUMENTS

| JP | 2016144172 A | * | 8/2016 | |
|---|---|---|---|---|
| JP | 2018-160815 A | | 10/2018 | |
| JP | 2018160815 A | * | 10/2018 | ......... H04L 12/4641 |
| WO | 2014/128840 A1 | | 8/2014 | |

OTHER PUBLICATIONS

English translation of JP-2018160815-A (Year: 2018).*
International Search Report, PCT/JP2019/042368, dated Feb. 4, 2020, 1 pg.

* cited by examiner

INPUT

OUTPUT TO DISTRIBUTION SIDE COMMUNICATION PORT 30-1

OUTPUT TO DISTRIBUTION SIDE COMMUNICATION PORT 30-2

INPUT

OUTPUT OF COMPARATIVE EXAMPLE

FIG. 8

| NOTIFICATION SOURCE ID | STATE CONTENT ID | TRANSFER INFORMATION TABLE ID |
|---|---|---|
| - | 0 | 0 |
| 1 | 1 | 1 |
| 2 | 2 | 2 |
| 3 | 3 | 3 |
| 4 | 4 | |
| ⋮ | ⋮ | ⋮ |

DURING NORMAL OPERATION

DURING CANCELLATION OPERATION

DATA TRANSFER APPARATUS AND DATA TRANSFER METHOD

This application is a national stage entry according to 35 U.S.C. 371 of International Application No. PCT/JP2019/042368, filed Oct. 29, 2019, which claims priority to Japanese Patent Application No. 2018-219662, filed Nov. 22, 2018, the contents of which are entirely incorporated herein by reference.

TECHNICAL FIELD

The present invention relates to a data transfer apparatus and a data transfer method.

BACKGROUND ART

In recent years, there is an expectation for self-driving vehicles in order to achieve a safe and secure transportation society, and technological development has been promoted in various countries around the world. The self-driving vehicle is required to periodically perform advanced information processing in cooperation with a large number of processing logics in order to recognize surrounding situations using sensor information generated periodically. In order to achieve stable self-driving, it is expected that information processing in the processing logic becomes more advanced and the types and amount of pieces of sensor data as input information for the information processing increase.

When the amount of pieces of sensor data increases, a network processing load for the processing logic to receive the pieces of sensor data via a communication network in the vehicle increases, and required hardware resources, that is, vehicle costs increase. On the other hand, an input rate of the sensor data required by the processing logic to obtain a desired result system may be lower than a generation rate of the sensor data in the sensor. Accordingly, in order to reduce the network load of the processing logic in the vehicle, it is necessary to control a communication rate of the sensor data on the communication network and suppress the communication rate required for the information processing of the processing logic.

PTL 1 discloses a gateway apparatus that relays communication between one terminal device connected to one bus constituting one network and another terminal device connected to another bus constituting another network between the one and the other network. The gateway apparatus includes a processing device that manages transmission of data received from the one bus to the other bus and manages transmission of data received from the other bus to the one bus. The processing device detects a first predetermined signal including information for designating a data transmission interval which is transmitted to the other terminal device from the one terminal device, stores the information, saves the data received from the other terminal device in a storage device, and transmits the saved data to the one terminal device according to the designation of the data transmission interval indicated by the stored information.

CITATION LIST

Patent Literature

PTL 1: JP 2015-000597 A

SUMMARY OF INVENTION

Technical Problem

In the invention described in PTL 1, the granularity of the time of the data to be transferred cannot be guaranteed.

Solution to Problem

A data transfer apparatus according to a first aspect of the present invention includes an acquisition side communication port that receives data including an identifier indicating a classification from an outside, a distribution side communication port that transmits the data to the outside, a storage unit that stores transfer information in which the identifier and a condition related to a time of the data are associated, and a transfer processing unit that decides whether or not to transmit received data which is the data to the distribution side communication port based on the identifier included in the received data and information of the time of the received data, and the transfer information when the received data is received by the acquisition side communication port. The information of the time of the received data is a time at which the received data is received by the acquisition side communication port or a time included in the received data.

A data transfer method according to a second aspect of the present invention is a data transfer method executed by a data transfer apparatus that includes an acquisition side communication port which receives data including an identifier indicating a classification from an outside, a distribution side communication port which transmits the data to the outside, and a storage unit which stores transfer information in which the identifier and a condition related to a time of the data are associated. The method includes deciding whether or not to transmit received data which is the data to the distribution side communication port based on the identifier included in the received data and information of the time of the received data, and the transfer information when the received data is received by the acquisition side communication port. The information of the time of the received data is a time at which the received data is received by the acquisition side communication port or a time included in the received data.

A data transfer apparatus according to a third aspect of the present invention includes an acquisition side communication port that receives data including an identifier indicating a classification from an outside, a distribution side communication port that transmits the data to the outside, a storage unit that stores transfer information in which the identifier and a condition related to an order of the data are associated, and a transfer processing unit that decides whether or not to transmit received data which is the data to the distribution side communication port based on the identifier included in the received data and information of the order of the received data, and the transfer information when the received data is received by the acquisition side communication port. The information of the order of the received data is an order in which the received data is received by the acquisition side communication port or information of the order included in the received data.

Advantageous Effects of Invention

According to the present invention, the granularity of the time of the data to be transferred can be constant.

BRIEF DESCRIPTION OF DRAWINGS

FIG. 8 is a diagram illustrating an example of a search target information table 200.

DESCRIPTION OF EMBODIMENTS

First Embodiment

Hereinafter, a first embodiment of a self-driving control system S will be described with reference to FIGS. 1 to 6.

Figure 1:
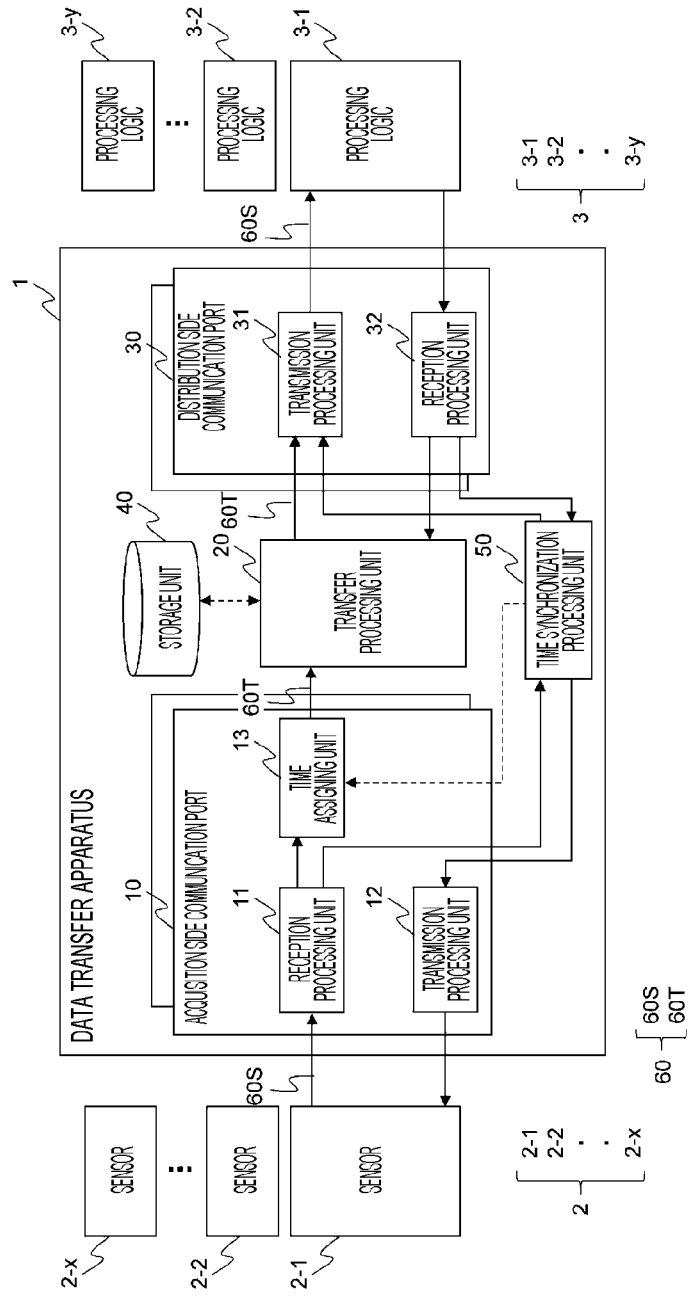
FIG. 1 is a configuration diagram of a self-driving control system S according to a first embodiment.

FIG. 1 is a configuration diagram of a data transfer apparatus according to the first embodiment. The self-driving control system S is mounted on a vehicle, and is referred to as an "own vehicle" in the present embodiment in order to distinguish this vehicle from other vehicles. The self-driving control system S includes a data transfer apparatus 1, sensors 2, and processing logics 3. The sensor 2 is a general term for one or more sensors, and the processing logic 3 is a general term for one or more processing logics.

The sensor 2 generates a sensor data packet 60S including sensing contents, and periodically outputs the sensor data packet 60S to the data transfer apparatus 1. The data transfer apparatus 1 transmits the sensor data packet 60S received from the sensor 2 to one or more processing logics 3 according to a classification. As will be described in detail later, the data transfer apparatus 1 may discard the sensor data packet 60S without transmitting the sensor data packet to any processing logic 3. The processing logic 3 executes information processing by using the received sensor data packet 60S as input information. The content of the information processing executed by the processing logic 3 is any content and any processing may be executed. An example of the processing logic 3 is, for example, processing related to self-driving of the vehicle.

The data transfer apparatus 1, the sensor 2, and the processing logic 3 have synchronized time information. However, the term "synchronized" herein means that information may be synchronized to the extent that accuracy required for processing executed by the processing logic 3 is satisfied. In the present embodiment, the data transfer apparatus 1, the sensor 2, and the processing logic 3 synchronize the time information for each predetermined time by a known time synchronization protocol. However, each of the data transfer apparatus, the sensor, and the processing logic has high accuracy timepiece, and thus, a state in which the time information is substantially synchronized may be maintained without performing periodic synchronization processing.

The sensor 2 is, for example, a camera, a laser radar, an ultrasonic sensor, or the like. The sensor 2 generates the sensor data packet 60S which is communication data including contents obtained by sensing the surrounding of the own vehicle. The sensor 2 transmits the generated sensor data packet 60S to the data transfer apparatus 1 at constant time intervals according to a time or a cycle designed in advance. However, here, a mass of communication data is simply called a "packet" for the sake of convenience, and a communication protocol is not limited. The "packet" may be referred to as a "datagram" or a "frame".

The sensor 2 assigns an identifier for distinguishing data in the self-driving control system S to each sensor data packet 60S. For example, a VLAN ID of Ethernet (registered trademark) is used as the identifier.

Hereinafter, each of the sensors 2 is represented by a reference sign with a hyphen and a serial number from 1. That is, the sensor 2 is a general term for a sensor 2-1, a sensor 2-2, . . . , and a sensor 2-x. Hereinafter, the sensor is simply referred to as the "sensor 2" in describing configurations and operations common to the sensors, and a reference sign with a hyphen and a serial number is used in describing an operation example of a specific sensor. Which reference sign the individual sensor corresponds to does not matter in the present embodiment. For example, the sensor 2-1 may correspond to the camera, may correspond to the laser radar, or may correspond to the ultrasonic sensor.

The processing logic 3 executes information processing by using the sensor data packet 60S received from the data transfer apparatus 1. Hereinafter, each of the processing logics 3 is represented by a reference sign with a hyphen and a serial number from 1. That is, the processing logic 3 is a general term for a processing logic 3-1 and a processing logic 3-2, . . . , and a processing logic 3-y. Hereinafter, the processing logic is simply referred to as the "processing logic 3" in describing configurations and operations common to the processing logics, and a reference sign with a hyphen and a serial number is used in describing an operation example of a specific processing logic. The content of the processing executed by each processing logic does not matter in the present embodiment. For example, the processing logic 3-1 may perform an arithmetic operation related to an operation of an engine, may perform an arithmetic operation related to an overall operation of the vehicle, or may perform an arithmetic operation related to a route arithmetic operation.

Each processing logic 3 performs processing on the premise that an output of any sensor 2 is input for each predetermined time. It is desirable that a timing at which the output of the sensor 2 to be input to the processing logic 3 is input is a predetermined cycle and is also a time interval at which the sensor 2 senses information included in the output to be input is constant. In the present embodiment, this is expressed as "granularity of the time is constant".

The data transfer apparatus 1 is an apparatus that is mounted on the vehicle and performs an arithmetic operation and communication, for example, an electronic control unit (ECU). The data transfer apparatus 1 includes, as functions, one or more acquisition side communication ports 10, a transfer processing unit 20, one or more distribution side communication ports 30, a storage unit 40, and a time synchronization processing unit 50.

Each acquisition side communication port 10 and each distribution side communication port 30 include a physical communication port. However, arithmetic operation processing functions provided by each acquisition side communication port 10 and each distribution side communication port 30 may be achieved by the same hardware, and an arithmetic operation processing function of the transfer processing unit 20 may also be achieved by the same hardware. The storage unit 40 is a non-volatile storage device, for example, a flash memory.

The transfer processing unit 20 includes a CPU as a central processing unit, a ROM as a read-only storage device, and a RAM as a readable and writable storage device, and the CPU achieves functions to be described later by expanding and executing a program stored in the ROM into the RAM. However, the transfer processing unit 20 may be achieved by a field programmable gate array (FPGA) which is a rewritable logic circuit instead of a combination of the CPU, the ROM, and the RAM, or an application specific integrated circuit (ASIC) which is an integrated circuit for specific applications. The transfer processing unit 20 may be achieved by a combination of different configurations, for example, a combination of the CPU, the ROM, the RAM, and the FPGA, instead of a combination of the CPU, the ROM, and the RAM.

Similar to the transfer processing unit 20, a hardware configuration of the time synchronization processing unit 50 may be achieved by using any of the CPU, the FPGA, and the ASIC, or may be achieved by a combination thereof. The transfer processing unit 20 and the time synchronization processing unit 50 may not be achieved by the same type of hardware, and when the transfer processing unit and the time synchronization processing unit are achieved by the same type of hardware, the transfer processing unit 20 and the time synchronization processing unit 50 may be achieved by integrated hardware.

Each of the acquisition side communication ports 10 is an interface connected to each of the sensors 2, and the number of acquisition side communication ports is equal to at least the number of sensors 2. Each acquisition side communication port 10 includes a reception processing unit 11, a transmission processing unit 12, and a time assigning unit 13. The reception processing unit 11 receives the sensor data packet 60S and a time synchronization packet from the connected sensor 2. The reception processing unit 11 causes the time assigning unit 13 to process the received packet when the received packet is the sensor data packet 60S, and causes the time synchronization processing unit 50 to process the received packet when the received packet is the time synchronization packet.

The transmission processing unit 12 receives the time synchronization packet from the time synchronization processing unit 50, and transmits the time synchronization packet to the connected sensor 2. When the sensor data packet 60S is received from the reception processing unit 11, the time assigning unit 13 acquires the time synchronized in the overall system from the time synchronization processing unit 50. The time assigning unit 13 assigns, as a reception time, time information at which the received sensor data packet 60S is acquired, and outputs, as a time data packet 60T, the received sensor data packet to the transfer processing unit 20.

When the time data packet 60T is received from the acquisition side communication port 10, the transfer processing unit 20 outputs the time data packet to any of the distribution side communication ports 30 or discards the time data packet. However, the transfer processing unit 20 may output the time data packet 60T to the plurality of distribution side communication ports 30. The transfer processing unit may not immediately discard the time data packet, and may discard the time data packet under a condition that a predetermined time elapses or a buffer is filled. In order to decide an output destination, the transfer processing unit 20 refers to the identifier and the reception time assigned to the time data packet 60T and a transfer information table 100 retained by the storage unit 40. Details will be described below.

Each of the distribution side communication ports 30 is an interface connected to each of the processing logics 3, and the number of distribution side communication ports is equal to at least the number of processing logics 3. Each distribution side communication port 30 includes a transmission processing unit 31 and a reception processing unit 32.

When the time data packet 60T is received from the transfer processing unit 20, the transmission processing unit 31 deletes the reception time assigned to the time data packet 60T and transmits the reception time to the connected processing logic 3. That is, the transmission processing unit 31 transmits the sensor data packet 60S to the processing logic 3. When the time synchronization packet is received from the time synchronization processing unit 50, the transmission processing unit 31 transmits the time synchronization packet to the connected processing logic 3.

The reception processing unit 32 receives the time synchronization packet from the connected processing logic 3, and transmits the received time synchronization packet to the time synchronization processing unit 50.

In the storage unit 40, one transfer information table 100 is stored in the present embodiment. The transfer information table 100 illustrates a correspondence between the identifier and the reception time assigned to the time data packet 60T received from the acquisition side communication port 10 by the transfer processing unit 20 and the distribution side communication port 30 to which the time data packet is transmitted. The time data packet 60T to which the combination of the identifier and the reception time which are not listed in the transfer information table 100 is assigned is discarded. The transfer information table 100 may be simply referred to as "transfer information".

The time synchronization processing unit 50 executes a time synchronization protocol for the data transfer apparatus 1, the sensor 2, and the processing logic 3 constituting the self-driving control system S to have the synchronized time information. The time synchronization processing unit 50 transmits and receives the time synchronization packet used by the sensor 2, the processing logic 3, and the time synchronization protocol. For example, the Precision Time Protocol (PTP) is used as the time synchronization protocol. Hereinafter, when the sensor data packet 60S and the time data packet 60T are not particularly distinguished, these packets are referred to as a "data packet 60". That is, the data packet 60 is a general term for the sensor data packet 60S and the time data packet 60T.

(Example of Transfer Information Table 100)

Figure 2:
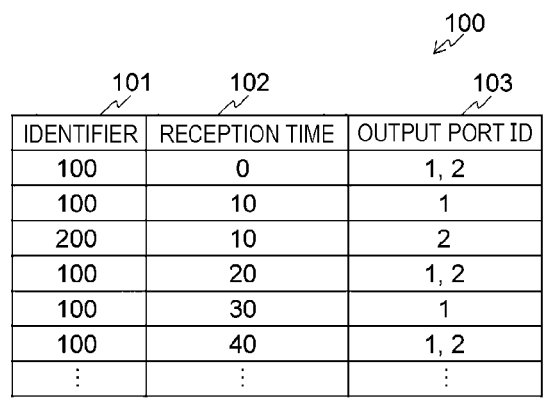
FIG. 2 is a diagram illustrating an example of a transfer information table 100 according to the first embodiment.

FIG. 2 is a diagram illustrating an example of the transfer information table 100. As described above, in the present embodiment, only one transfer information table 100 is stored in the storage unit 40.

The transfer information table 100 includes a plurality of entries, and each entry includes an identifier 101, a reception time 102, and an output port ID 103. The identifier 101 is an identifier of data and is assigned by the sensor 2. The reception time 102 is a reception time assigned to the sensor data packet 60S by the time assigning unit 13. The output port ID 103 is an ID for identifying the distribution side communication port 30 that outputs the sensor data packet 60S, and one or a plurality of IDs is included in one entry.

The reception time 102 may be a specific time that is applicable only once, or may be a part of time information that is applicable repeatedly. A specific time that is applicable only once is, for example, "Jan. 2, 2019 3:45:1.2345". A part of the time information that is applicable repeatedly is, for example, "cycle break+10 ms" on the premise that an operation is performed in a cycle of 100 ms. When the time information that is applicable repeatedly is used, a predetermined time, for example, a time when a power supply of the data transfer apparatus 1 is turned on may be used as a reference time, that is, a start point of a time count.

An example of the reception time 102 illustrated in FIG. 2 is a description when the self-driving control system S operates in a cycle of 100 ms, and specifically, a case where the reception time 102 which is a first entry is "0" means that the reception time is "reference time+100 ms×N" when N is an integer. Specifically, a case where the reception time 102 which is a second entry in FIG. 2 is "10" means that the reception time is "reference time+100 ms×N+10 ms" when N is an integer.

(Operation of Transfer Processing Unit 20)

Figure 3:
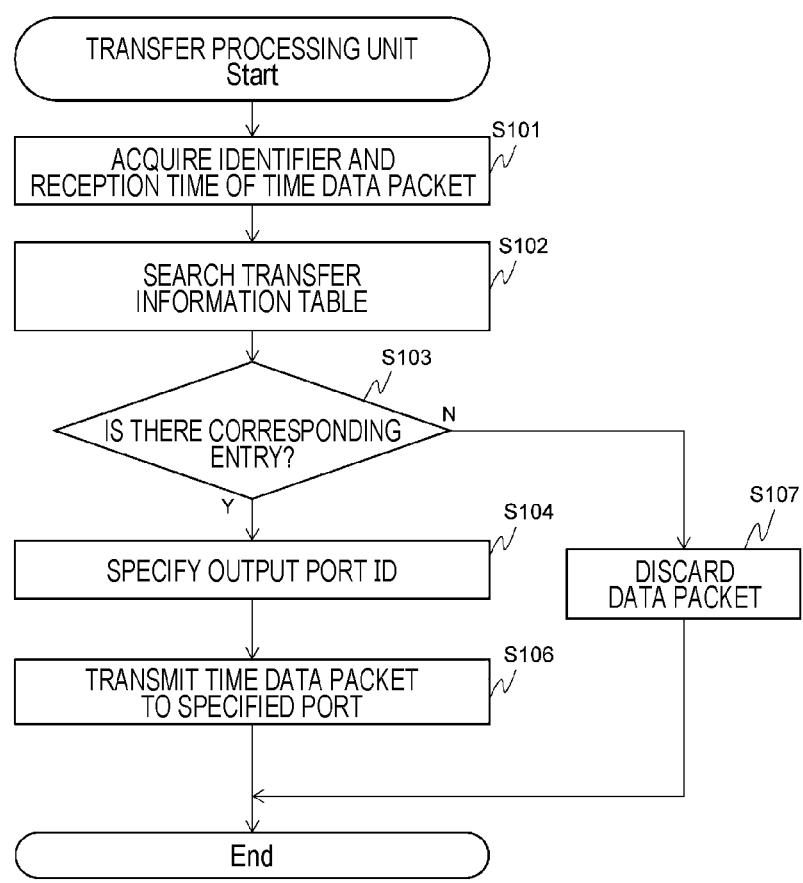
FIG. 3 is a flowchart illustrating an operation of a transfer processing unit 20.

FIG. 3 is a flowchart illustrating an operation of the transfer processing unit 20. When the time data packet 60T is received from the acquisition side communication port 10, the transfer processing unit 20 starts processing illustrated in FIG. 3. First, the transfer processing unit 20 acquires values of the identifier and the reception time assigned to the received time data packet 60T (S101). Subsequently, the transfer processing unit 20 searches the transfer information table 100 of the storage unit 40 by using, as keys, the combination of the acquired identifier and reception time (S102). The transfer processing unit 20 determines whether or not there is an entry corresponding to the transfer information table 100 as a search result in S102 (S103). The transfer processing unit 20 proceeds to S104 when it determines that there is the corresponding entry, and proceeds to S107 when it determines that there is no corresponding entry.

In S104, the transfer processing unit 20 specifies the output port ID while referring to the corresponding entry listed in the transfer information table 100. The transfer processing unit 20 transmits the received time data packet 60T to the distribution side communication port 30 having the ID specified in S104 (S106). When there is the plurality of output port IDs specified in S104, the received time data packet 60T is duplicated and is transmitted to each distribution side communication port 30.

In S107 which is executed when the determination result is negative in S103, the transfer processing unit 20 discards the received time data packet 60T. When the execution of S106 or S107 is completed, the transfer processing unit 20 ends the processing illustrated in FIG. 3.

(Operation Example)

Figure 4:
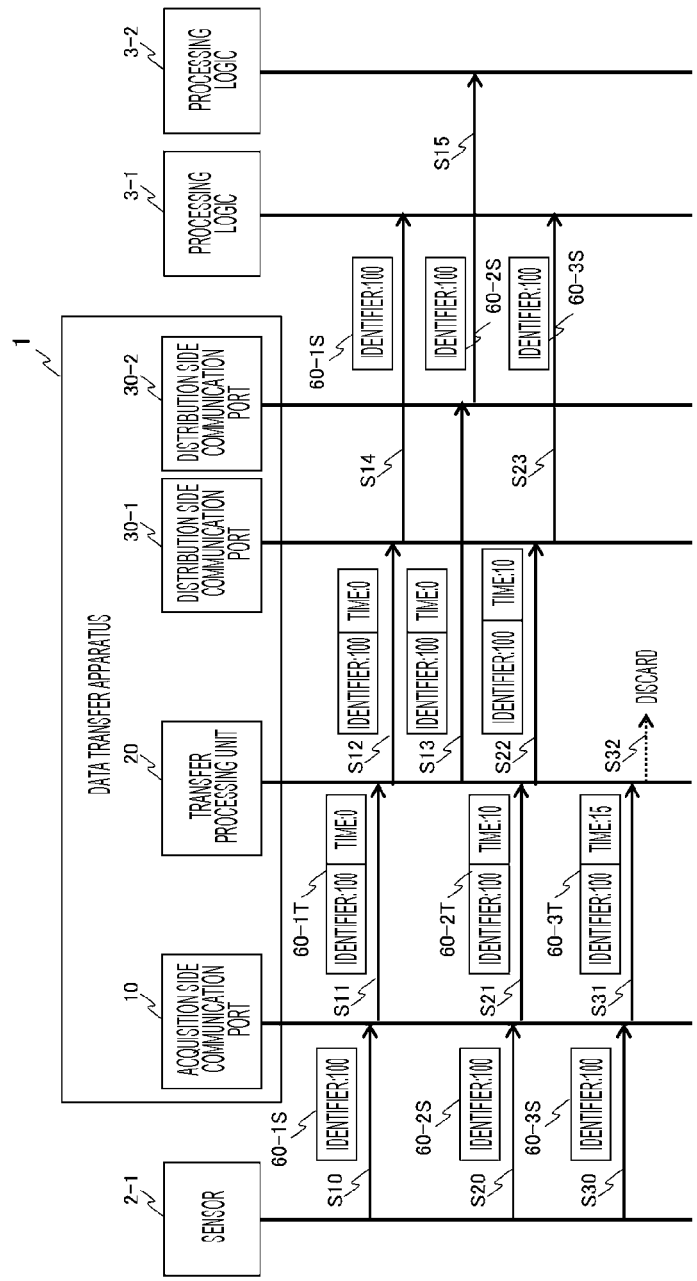
FIG. 4 is a diagram illustrating an operation sequence example of the self-driving control system S according to the first embodiment.

FIG. 4 is a diagram illustrating an example of an operation sequence according to the first embodiment. In this operation example, it is assumed that the transfer information table 100 is illustrated in FIG. 2. In FIG. 4, the two distribution side communication ports 30 provided in the data transfer apparatus 1 are described as a "distribution side communication port 30-1" and a "distribution side communication port 30-2".

First, the acquisition side communication port 10 receives a sensor data packet 60-1S to which an identifier [100] is assigned from the sensor 2 (S10). The time assigning unit 13 of the acquisition side communication port 10 assigns [0] which is the reception time to the sensor data packet 60-1S and transmits, as a time data packet 60-1T, the sensor data packet to the transfer processing unit 20 (S11). The transfer processing unit 20 searches the transfer information table 100 by using, as keys, the identifier [100] and the reception time [0]. The transfer processing unit 20 confirms the presence of the corresponding entry, that is, the first entry, and acquires output port IDs [1, 2].

In this case, since the number of acquired output port IDs is two, the transfer processing unit 20 duplicates the received time data packet 60-1T and transmits the received time data packets to the distribution side communication ports 30-1 and 30-2 indicated by the output port IDs (S12 and S13). The distribution side communication ports 30-1 and 30-2 that receive the time data packets 60-1T from the transfer processing unit 20 delete the reception time assigned to the time data packets 60-1T in the transmission processing unit 31, and uses the time data packets as the sensor data packets 60-1S. The transmission processing unit 31 transmits the sensor data packets 60-1S to the connected processing logic 3-1 and processing logic 3-2 (S14 and S15).

Subsequently, a sensor data packet 60-2S is received by the acquisition side communication port 10 (S20), is assigned a time [10], and is transmitted, as a time data packet 60-2T, to the transfer processing unit 20 (S21). The transfer processing unit 20 searches the transfer information table 100 and acquires an output port ID [1]. Since the number of acquired output ports ID is one, the time data packet 60-2T is not duplicated and is transmitted only to the distribution side communication port 30-1 (S22) and is transmitted to the processing logic 3-1 (S23).

A sensor data packet 60-3S is received by the acquisition side communication port 10 (S30), is assigned a time [15] at this time, and is transmitted, as a time data packet 60-3T, to the transfer processing unit 20 (S31). The transfer processing unit 20 searches the transfer information table 100 by using, as keys, the identifier [100] and the reception time [15]. However, since there is no corresponding entry in the transfer information table 100, the transfer processing unit 20 discards the time data packet 60-3T (S32).

Figure 5A:
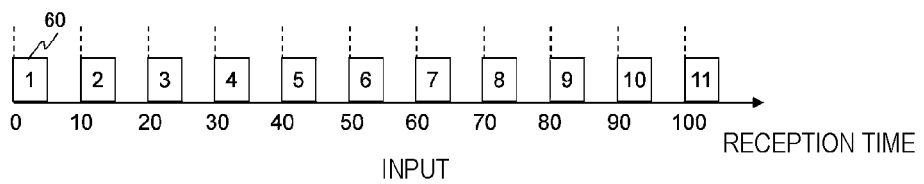
FIGS. 5A, 5B, and 5C are diagrams illustrating an operation example of the self-driving control system S according to the first embodiment.

Input and output pattern examples of the data packet 60 achieved by the processing of the data transfer apparatus 1 illustrated in the present embodiment will be described with reference to FIG. 5. However, the transfer information table 100 is also the example illustrated in FIG. 2. FIG. 5A is a diagram illustrating an input pattern example of the sensor data packets 60S from the sensor 2-1 to the data transfer apparatus 1, and FIG. 5B is a diagram illustrating an output pattern example of the sensor data packets 60S from the data transfer apparatus 1 to the distribution side communication port 30-1, and FIG. 5C is a diagram illustrating an output pattern example of the sensor data packet 60S from the data transfer apparatus 1 to the distribution side communication port 30-2.

Figure 5B:
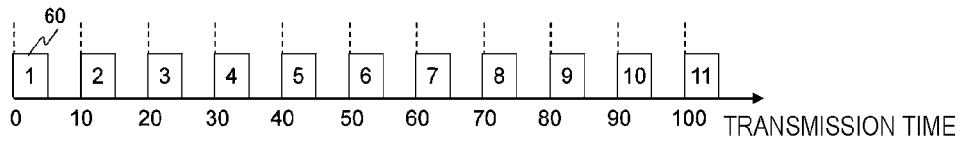
Figure 5C:
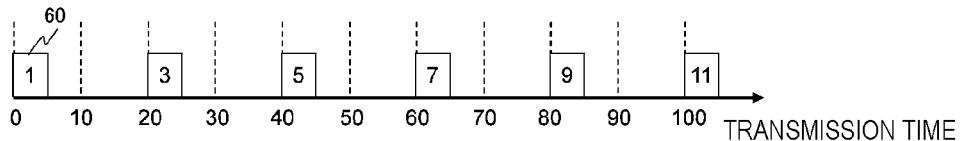

In FIGS. 5A to 5C, the time elapses as the time moves to the right, and the times are synchronized in the three diagrams. Numerals 1 to 11 in the sensor data packets 60S in FIG. 5 indicate sequence numbers of the same type of sensor data packets 60S. FIG. 5A illustrates that the sensor data packets 60S are received in a cycle of 10 ns by using the reception time of the sensor data packet 60S of the sequence number 1 as a reference. The transfer processing unit 20 operates as described with reference to FIGS. 3 and 4. However, it is assumed that the transfer information table 100 illustrates a repetitive operation in a cycle of 40 ns. That is, in 50 ns, the transfer processing unit 20 refers to the entry of which the reception time is [10].

When the sensor data packets 60S are input in the pattern illustrated in FIG. 5A, the transfer processing unit 20 outputs the sensor data packets 60S as illustrated in FIGS. 5B and 5C according to the list in the transfer information table 100. That is, the transfer processing unit 20 outputs all the sensor data packets 60S to the distribution side communication port 30-1 in a cycle of 10 ns which is the same communication rate as the input. The transfer processing unit 20 outputs the sensor data packets to the distribution side communication port 30-2 in a cycle of 20 ns which is ½ of the input communication rate. Since the transfer processing unit 20 decides whether or not to transfer based on the reception time of the sensor data packet 60S, the sequence numbers of the sensor data packets 60S to be transmitted to the distribution side communication port 30-2 have periodicity.

Specifically, as illustrated in FIG. 5C, the sequence numbers of the sensor data packets 60S to be transmitted to the distribution side communication port 30-2 are "1, 3, 5, 7, 9, 11", and increase by 2 or jumps by 1. In other words, the granularity of the time of the sensor data included in the sensor data packet 60S to be transmitted from the data transfer apparatus 1 is constant.

Comparative Example

An operation of the comparative example will be described with reference to FIG. 6. In a comparative example data transfer apparatus which is a comparative example, a minimum output interval which is a minimum output time interval for outputting the data packet 60 is defined without using the transfer information table 100. The comparative example data transfer apparatus outputs any data packet 60 at an interval equal to or shorter than the minimum output interval.

Figure 6A:
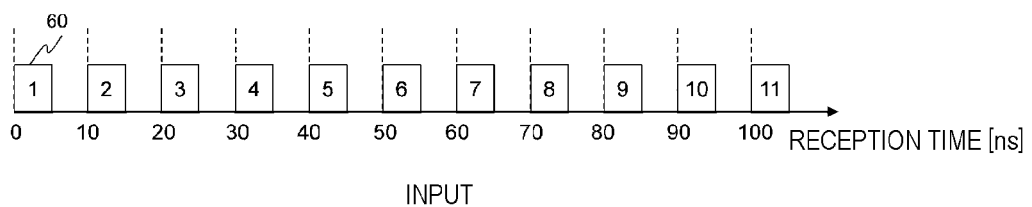
FIGS. 6A and 6B are diagrams illustrating an operation of a comparative example.
Figure 6B:
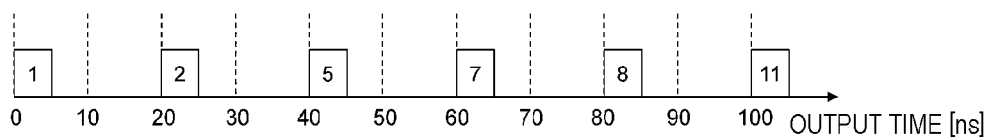

FIG. 6A is a diagram illustrating the data packets 60 to be input to the comparative example data transfer apparatus, and numerals 1 to 11 in the data packets 60 indicate sequence numbers of the same type of data packets 60. FIG. 6B illustrates an output of the comparative example data transfer apparatus when the minimum output interval is 20 ns. In FIGS. 6A and 6B, the time elapses as the time moves to the right, and one scale illustrates 10 ns. However, in the following description, the unit of time [ns] is omitted, and for example, 10 ns is called "time 10".

First, the comparative example data transfer apparatus outputs the received data packet 60 of the sequence number 1 at time 0. Subsequently, the comparative example data transfer apparatus does not output at time 10, but saves the data packet 60 of the sequence number 2. The comparative example data transfer apparatus receives the data packet 60 of the sequence number 3 at time 20, but outputs the saved data packet 60 of the sequence number 2.

The comparative example data transfer apparatus saves the data packet 60 of the sequence number 4 at time 30, and outputs the received data packet 60 of the sequence number 5 at time 40. When only the minimum output interval is defined in this manner, the output itself is constant in cycle of 20 ns as illustrated in FIG. 6B, but an interval of the sequence numbers of the output data packets 60 is not constant. That is, the granularity of the time of the sensor data included in the data packet 60 to be transmitted from the comparative example data transfer apparatus is not constant. On the other hand, the granularity of the time of the sensor data included in the data packet 60 to be transmitted from the data transfer apparatus 1 is constant.

According to the aforementioned first embodiment, the following advantageous effects are obtained.

(1) The data transfer apparatus 1 includes the acquisition side communication port 10 that receives the data including the identifier indicating the classification from the outside, the distribution side communication port 30 that transmits the data to the outside, the storage unit 40 that stores the transfer information table 100 in which the identifier and the condition related to the time of the data are associated, and the transfer processing unit 20 that decides whether or not to transmit the received data which is the data to the distribution side communication port 30 based on the identifier included in the received data and the information of the time of the received data, and the transfer information when the received data is received by the acquisition side communication port 10. The information of the time of the received data is a time at which the received data is received by the acquisition side communication port. Thus, as illustrated in FIG. 5, the granularity of the time of the received data to be transmitted to the outside is constant, that is, the interval of the reception time of the sensor data to be transmitted by the data transfer apparatus 1 is constant.

(2) The number of distribution side communication ports 30 is equal to or greater than the number of processing logics 3, that is, the plurality of distribution side communication ports is provided. As illustrated in FIG. 2, the identifier and the condition related to the time of the data are associated with at least one distribution side communication port in the transfer information table 100. The transfer processing unit 20 transmits the received data to the distribution side communication port 30 associated with the identifier included in the received data and the information of the time of the received data. The data transfer apparatus 1 can transmit the sensor data packet 60S to the appropriate processing logic 3 according to the condition of the time.

Modification Example 1

The reception time 102 of the transfer information table 100 may be expressed by a mathematical formula or a range. That is, some conditions related to the time may be described as the reception time 102. When the reception time is expressed by the mathematical formula, for example, the mathematical formula may be expressed by a polynomial such as "$N+3N^2+5N^3$" by using N which is an arbitrary integer. When the reception time is expressed by the range, for example, "8 to 12" may be used instead of "10" in a second entry in FIG. 2.

Modification Example 2

The data transfer apparatus 1 may include only one distribution side communication port 30. In this case, since there is only one output destination, that is, there is no option, it is not necessary to specify the distribution side communication port 30, and the output port ID 103 may be deleted from the transfer information table 100.

Modification Example 3

The data transfer apparatus 1 may constantly transmit the same sensor data packet 60S to all the distribution side communication ports 30. In this case, since it is not necessary to specify the distribution side communication port 30, the output port ID 103 may be deleted from the transfer information table 100.

Modification Example 4

The sensor 2 may transmit the sensor data packet 60S including the time information. Since the pieces of time information of the sensor 2 and the data transfer apparatus 1 are synchronized, there is no substantial difference regardless of which of the sensor 2 and the data transfer apparatus 1 assigns the time information. In this case, the data transfer apparatus 1 does not include the time assigning unit 13, and handles the sensor data packet 60S received from the sensor 2 as the time data packet 60T in the first embodiment. In this case, the transmission processing unit 31 may transmit the time information to the processing logic 3 without deleting the time information from the time data packet 60T.

Second Embodiment

A second embodiment of the data transfer apparatus will be described with reference to FIGS. 7 to 11. In the following description, the same components as those in the first embodiment are assigned by the same reference signs, and differences will be mainly described. Points not particularly described are the same as those in the first embodiment. The present embodiment is different from the first embodiment mainly in that the transfer processing unit 20 selects the transfer information table 100 according to a situation.

(Configuration)

Figure 7:
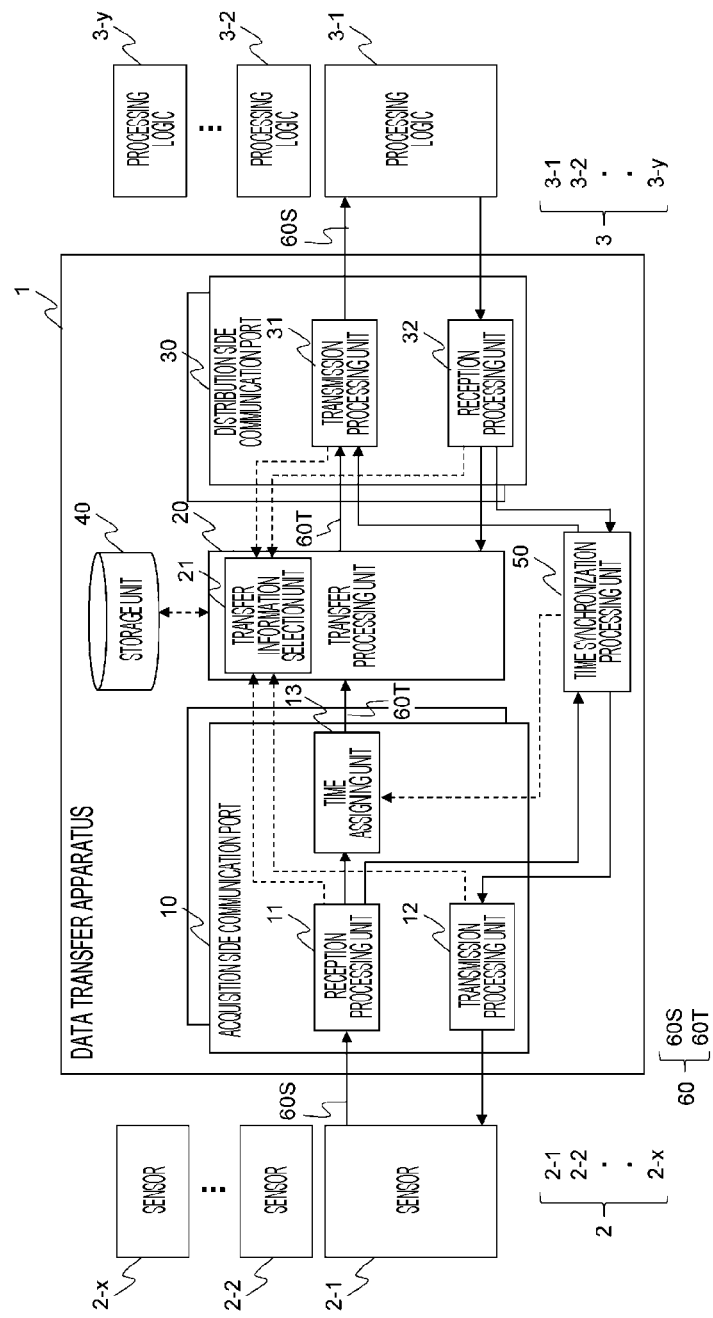
FIG. 7 is a configuration diagram of a self-driving control system S according to a second embodiment.

FIG. 7 is a configuration diagram of the self-driving control system S according to the second embodiment. In the present embodiment, a transfer information selection unit 21 is provided in the transfer processing unit 20, and the storage unit 40 stores a plurality of transfer information tables 100 and one search target information table 200 to which IDs are assigned. The transfer information selection unit 21 specifies an ID of the transfer information table 100 as a search target of the transfer processing unit 20 according to states of the sensor 2, the processing logic 3, the acquisition side communication port 10, and the distribution side communication port 30. The transfer information selection unit 21 refers to the search target information table 200 for specifying this ID.

FIG. 8 is a diagram illustrating an example of the search target information table 200. The search target information table 200 has a plurality of entries, and each entry includes a notification source ID 201, a state content ID 202, and a transfer information table ID 203. In other words, the search target information table 200 stores a plurality of sets in which the notification source ID 201, the state content ID 202, and the transfer information table ID 203 are associated with each other. The notification source ID 201 and the state content ID 202 correspond to the notification source ID and the state content ID assigned to a state notification packet to be described later. The transfer information table ID 203 is an ID that identifies the transfer information table 100.

Two or more combinations of the notification source ID 201 and the state content ID 202 may be associated, as one search key, for each transfer information table ID. For example, an entry of a transfer information table ID [3] corresponds to a case where the transfer information table is searched for by using, as keys, combinations of both a notification source ID [3] and a state content ID [3], and a notification source ID [4] and a state content ID [4]. Only a first entry in the example illustrated in FIG. 8 is special, and the other entries indicate that the transfer information table 100 of which the ID is [0] is used in an initial state, that is, in a normal state in which an abnormality does not occur. Hereinafter, the transfer information table 100 of which the ID is [0] is referred to as an "initial table".

Although the combination of one set of the notification source ID 201 and the state content ID 202 is associated as each search key in FIG. 8, even though a plurality of combinations of the communication source IDs 201 and the state content IDs 202 may be associated as search keys. For example, when the combination of the communication source ID [1] and the state content ID [1] and the combination of the communication source ID [3] and the state content ID [3] are simultaneously applicable, there may be the entry that uses the transfer information table 100 of which the ID is [9].

In this case, when the defect of the combination of the notification source ID [3] and the state content ID [3] is resolved in a state in which the entry that uses the transfer information table 100 of which the ID is [9] is selected, the entry is selected as follows. That is, since the combination of the notification source ID [1] and the state content ID [1] remains, the entry that uses the transfer information table 100 of which the ID is [1] is selected according to the example of FIG. 8. Referring back to FIG. 7, the description is continued.

In the second embodiment, the sensor 2, the processing logic 3, the reception processing unit 11, the reception processing unit 32, the transmission processing unit 12, and the transmission processing unit 31 can detect a state change, and generates the state notification packet and notifies the transfer information selection unit 21 of the data transfer apparatus 1 of the state notification packet when the state change is detected. The state notification packet will be described later.

The detection of the state change is the detection that the sensor 2 cannot be sensed, the detection that a hardware failure occurs in the processing logic 3, the detection that it is determined that the result of the information processing in the processing logic 3 is a predetermined value, for example, self-driving control is canceled, or the like. The detection of the state change of the reception processing unit 11, the reception processing unit 32, the transmission processing unit 12, and the transmission processing unit 31 is, for example, the detection of the occurrence of a communication failure with the sensor 2 and the processing logic 3. The detection that various failures are resolved is also included in the detection of the state change.

The state notification packet includes a notification source ID that specifies a transmission source of the packet and a state content ID that specifies a content of the state change. The notification source ID and the state content ID are decided in advance in the design of the system and are stored in advance in each transmission source of the state notification packet. The state content ID when the state is returned from the communication failure state to the normal state is, for example, [0] and is commonly used by all transmission sources. The state notification packets to be transmitted from the sensor 2 and the processing logic 3 are detected by the reception processing unit 11 and the reception processing unit 32, and are transmitted to the transfer information selection unit 21.

When the state notification packet is received, the transfer information selection unit 21 reads the combination of the notification source ID and the state content ID assigned to the state notification packet. The transfer information selection unit 21 searches the search target information table 200 for the combination of the read notification source ID and state content ID, and specifies the ID of the transfer information table 100 associated with the combination. The transfer processing unit 20 uses the transfer information table 100 corresponding to the ID specified by the transfer information selection unit 21.

Since the state notification packet is also transmitted when the state is returned to the normal state, the transfer information selection unit 21 specifies an ID of an initial table which is the transfer information table 100 used in a state in which there is no abnormality based on the information included in the received state notification packet.

The transfer processing unit 20 searches for the combination of the reception time and the identifier included in the received time data packet 60T while referring to the transfer information table 100 corresponding to the ID specified by the transfer information selection unit 21. Since the operation of the transfer processing unit 20 after the search is the same as that of the first embodiment, the description thereof will be omitted.

(Operation of Transfer Information Selection Unit 21)

Figure 9:
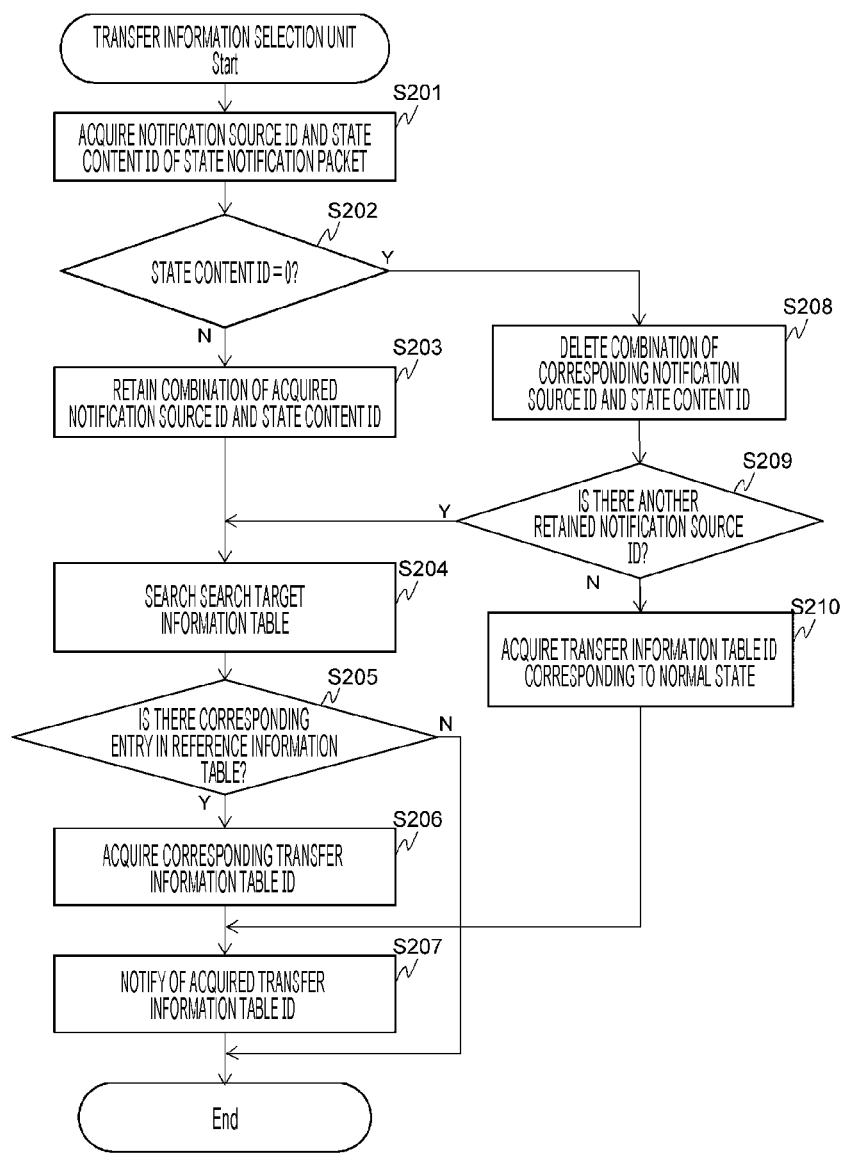
FIG. 9 is a flowchart illustrating processing of a transfer information selection unit 21.

FIG. 9 is a flowchart illustrating processing of the transfer information selection unit 21. When the state notification packet is received, the transfer information selection unit 21 starts the processing illustrated in FIG. 9.

When the state notification packet is received, the transfer information selection unit 21 acquires the values of the notification source ID and the state content ID assigned to the packet (S201). The transfer information selection unit 21 determines whether or not the acquired state content ID is [0] indicating that the state is returned to the normal state (S202), and proceeds to S208 when it is determined that the state content ID is not [0] and proceeds to S203 when it is determined that the state content ID is [0]. In S203, the transfer information selection unit 21 adds the combination of the acquired notification source ID and state content ID to the already retained notification source ID and state content ID, retains the notification source ID and state content ID, and proceeds to S204.

In S204, the transfer information selection unit 21 searches the search target information table 200 by using, as keys, all the combinations of the retained notification source ID and state content ID. Subsequently, the transfer information selection unit 21 determines whether or not there is the entry corresponding to the search target information table 200 as the result of the search (S205). When it is determined that there is the entry, the transfer information selection unit 21 acquires the transfer information table ID from the corresponding entry (S206) and notifies the transfer processing unit 20 of the acquired transfer information table ID (S207). When the determination result is negative in S205, the transfer information selection unit 21 ends the processing illustrated in FIG. 9 as it is.

In S208 which is executed when the determination result is positive in S202, the transfer information selection unit 21 deletes the combination of the corresponding notification source ID and state content ID. In the following S209, the transfer information selection unit 21 determines whether or not there is another combination of the notification source ID and the state content ID retained by the transfer information selection unit 21. The transfer information selection unit 21 proceeds to S204 when it is determined that there is another combination, and proceeds to S210 when it is determined that there is no other combination. In S210, the transfer information selection unit 21 acquires the transfer information table ID corresponding to the normal state from the search target information table 200 in the storage unit 40, and proceeds to S207.

(Operation Example)

An operation example of the data transfer apparatus 1 in the present embodiment will be described with reference to FIGS. 10 and 11.

In the self-driving system illustrated in FIG. 10, the sensor 2, the processing logic 3-1, and the processing logic 3-2 are connected via the data transfer apparatus 1. The processing logic 3-1 operates on a high-specification CPU in order to execute information processing determination control for self-driving during a normal operation. The processing logic 3-2 operates on a low-specification CPU as an information processing logic during a degeneracy operation due to a failure in the processing logic 3-1.

Figure 10A:
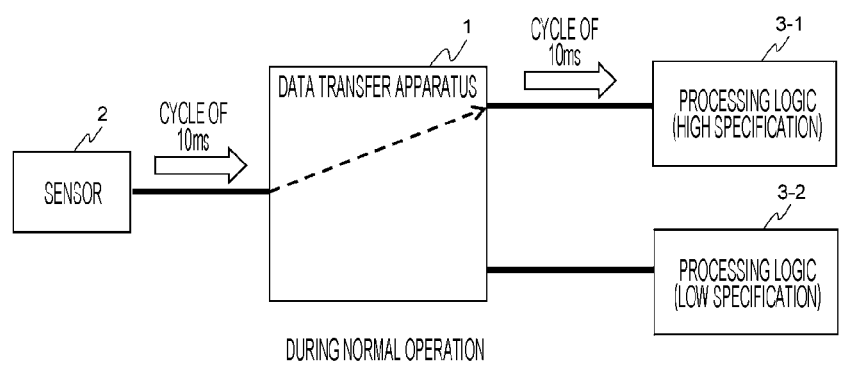
FIGS. 10A and 10B are diagrams illustrating an operation example of the self-driving control system S according to the second embodiment.

As illustrated in FIG. 10A, during the normal operation, all the data packets 60 output by the sensor 2 in 10 ms are transferred to the processing logic 3-1, and advanced information processing is executed. On the other hand, when a failure occurs in the processing logic 3-1 and, for example, the processing logic 3-1 transmits the state notification packet to the data transfer apparatus 1, the data transfer apparatus 1 operates as follows.

Figure 10B:
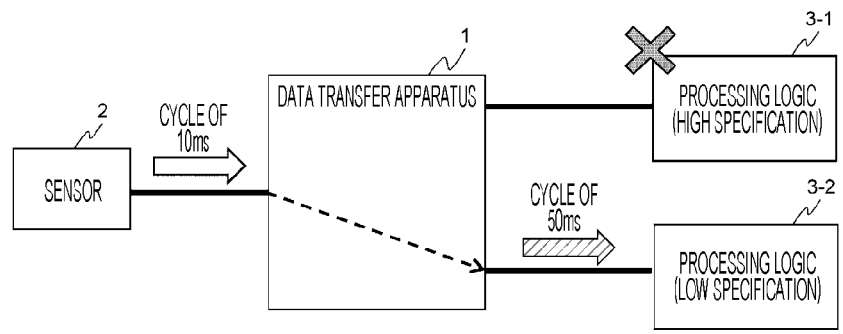

That is, as illustrated in FIG. 10B, the data transfer apparatus 1 changes the transfer information table as the search target during the data packet transfer based on the packet, stops the data transfer to the processing logic 3-1, and performs the subsequent processing. That is, the data transfer apparatus 1 reduces a communication rate of the data packet 60 received from the sensor 2 in a cycle of 10 ms to a cycle of 50 ms for the processing logic 3-2 for the degeneracy operation. In this case, the data transfer apparatus 1 can select and output the received data packet 60 exactly every 5 packets. Accordingly, it is possible to secure the granularity of the time of the sensor data while reducing an unnecessary network processing load.

In the self-driving system illustrated in FIG. 11, the sensor 2, the processing logic 3-1, and the processing logic 3-2 are connected via the data transfer apparatus 1 as in FIG. 10. The processing logic 3-1 executes information processing of the self-driving determination control during the normal operation. The processing logic 3-2 saves, as a log, the data packet 60 to be transmitted by the sensor 2.

Figure 11A:
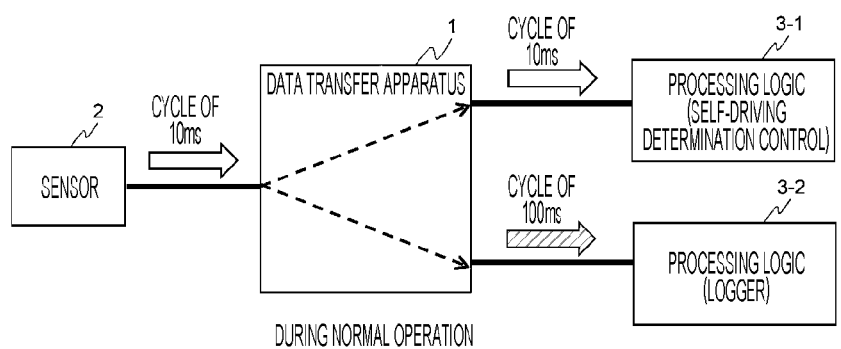
FIGS. 11A and 11B are diagrams illustrating the operation example of the self-driving control system S according to the second embodiment.

As illustrated in FIG. 11A, during the normal operation, the data transfer apparatus 1 transfers all the data packets 60 output by the sensor 2 in 10 ms to the processing logic 3-1, and executes advanced information processing. Similarly, during the normal operation, the data transfer apparatus 1 reduces the communication rate for the processing logic 3-2 in a cycle of 100 ms, and accurately selects and outputs the received data packet 60 exactly every 10 packets. Such transfer processing is executed, and thus, it is possible to reduce the amount of log acquisition in the normal time of the processing logic 3-2 which is a logger, and reduce a network processing load while saving a storage.

Figure 11B:
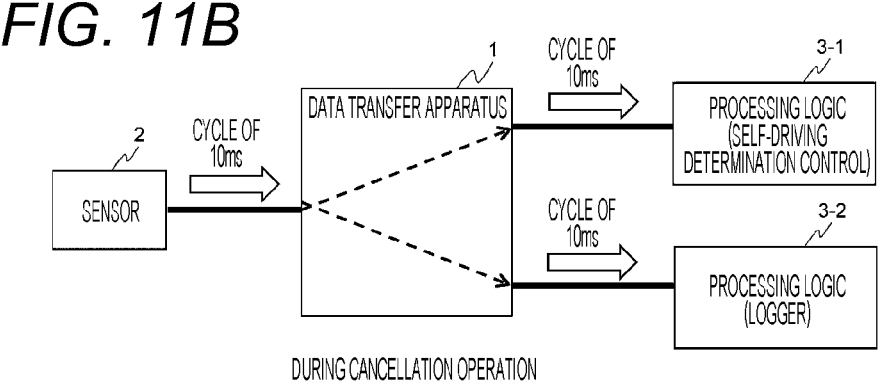

Thereafter, it is assumed that as a result of the information processing for the self-driving determination control in the processing logic 3-1, a cancellation operation of the self-driving is executed and the processing logic 3-1 transmits the state notification packet to the data transfer apparatus 1. In this case, as illustrated in FIG. 11B, the data transfer apparatus 1 changes the operation, for example, as follows by changing the transfer information table as the search target during the data packet transfer based on the packet. That is, the data transfer apparatus 1 can change the operation such that the detailed log is acquired by transferring the data to the processing logic 3-1 as it is in a cycle of 10 ms and also transferring the data to the processing logic 3-2 as the logger in a cycle of 10 ms.

According to the aforementioned second embodiment, the following advantageous effects are obtained.

(3) The storage unit 40 stores the plurality of transfer information tables 100. The transfer processing unit 20 selects any transfer information table 100 from among the plurality of transfer information tables 100 while referring to the search target information table 200 based on the state of the acquisition side communication port 10, the state of the distribution side communication port 30, the state of the device connected to the acquisition side communication port 10, that is, the sensor 2, and the state of the device connected to the distribution side communication port 30, that is, the processing logic 3, and uses the selected transfer information table in the decision related to the received data. Thus, the data can be transferred according to the situation as illustrated in FIGS. 10 and 11.

(4) The transfer processing unit 20 receives the information regarding the states from the sensor 2 and the processing logic 3, and determines the states of the sensor 2 and the processing logic 3.

(Modified Example of Second Embodiment)

It has been described in the above-described second embodiment that all the sensor 2, the processing logic 3, the reception processing unit 11, the reception processing unit 32, the transmission processing unit 12, and the transmission processing unit 31 detect the state change and notify the transfer information selection unit 21 of the state notification packet. However, at least one of the sensor 2, the processing logic 3, the reception processing unit 11, the reception processing unit 32, the transmission processing unit 12, and the transmission processing unit 31 may detect the state change and notify the transfer information selection unit 21 of the state notification packet.

Third Embodiment

A third embodiment of the data transfer apparatus will be described with reference to FIGS. 12 to 14. In the following description, the same components as those in the second embodiment are assigned the same reference signs, and differences will be mainly described. Points not particularly described are the same as those in the second embodiment. The present embodiment is different from the second embodiment in that a communication abnormality is mainly detected by using the transfer information table 100.

Figure 12:
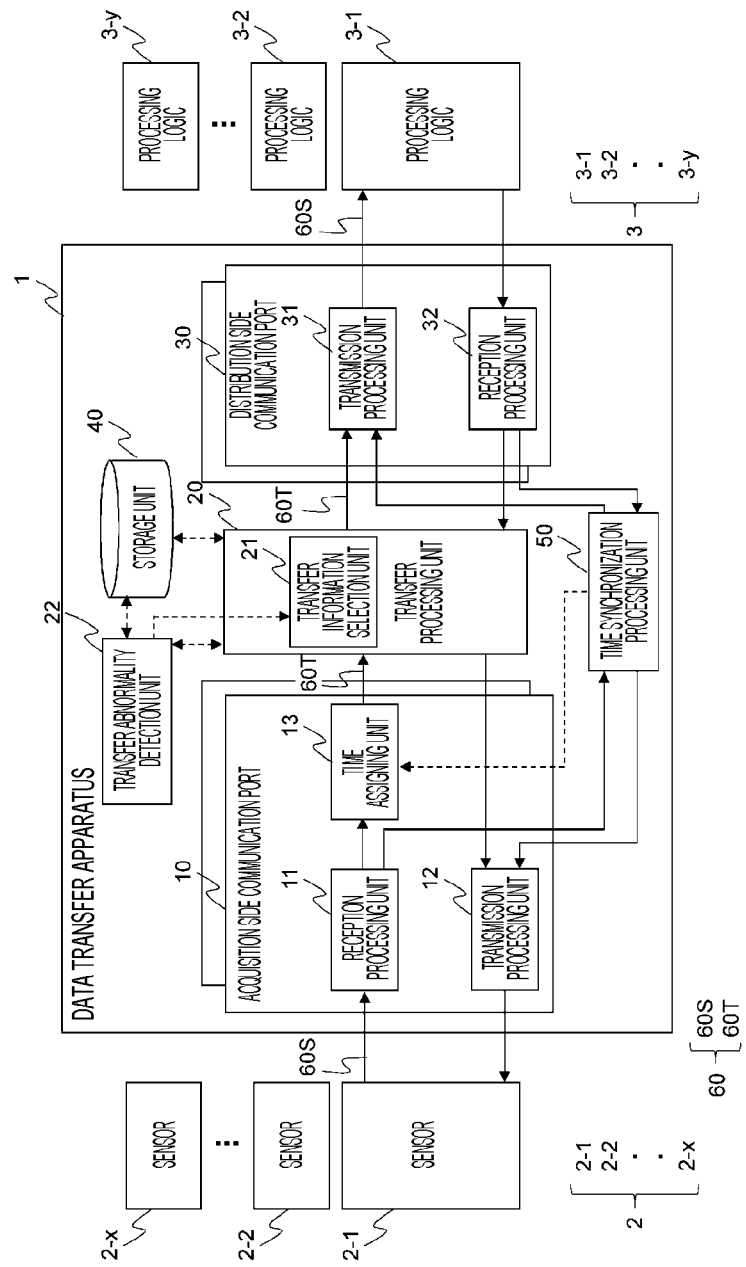
FIG. 12 is a configuration diagram of a self-driving control system S according to a third embodiment.

FIG. 12 is a configuration diagram of the self-driving control system S according to the third embodiment. The data transfer apparatus 1 of this system includes a transfer abnormality detection unit 22 in addition to the configurations of the first embodiment and the second embodiment. The storage unit 40 in the present embodiment includes two or more transfer information tables 100, one search target information table 200, and one notification source ID conversion table 300.

Figure 13:
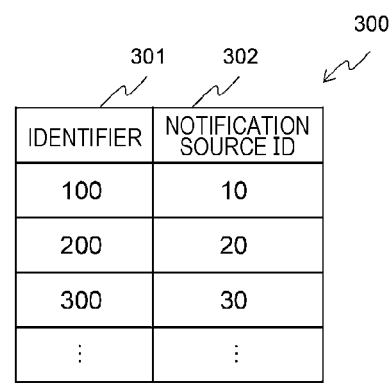
FIG. 13 is a diagram illustrating an example of a notification source ID conversion table 300.

FIG. 13 is a diagram illustrating an example of the notification source ID conversion table 300. The notification source ID conversion table 300 includes an identifier 301 and a notification source ID 302. The identifier 301 corresponds to the identifier 101 of the transfer information table 100. The notification source ID is an ID that specifies the transmission source of the sensor data packet 60S including the identifier in this system, and is decided in advance in the system design. Referring back to FIG. 12, the description is continued.

The transfer processing unit 20 performs processing to be described below in addition to the processing in the second embodiment. That is, when the sensor data packet 60S is received from the acquisition side communication port 10, the transfer processing unit 20 transmits the identifier and the reception time assigned to the packet to the transfer abnormality detection unit 22.

The transfer abnormality detection unit 22 retains the identifier and the reception time received immediately before. In addition to these values, the transfer abnormality detection unit 22 searches the transfer information table 100 which is the initial table by using, as keys, the newly received identifier and reception time. When the entry applicable to the search condition is not continuous in the initial table, the transfer abnormality detection unit 22 detects that an abnormality occurs in the sensor 2. That is, the transfer abnormality detection unit 22 detects the abnormality of the sensor 2 based on the two pieces of received data received consecutively, that is, the two sensor data packets 60S and the initial table.

For example, in the example of the initial table illustrated in FIG. 2, when the combination of the identifier and the reception time received immediately before is [100] and [20] and the combination of the identifier and the reception time received in the current time is [100] and [40], the determination is as follows. That is, since there is the combination of [100] and [30] between both the combinations and the reception thereof is not performed, the transfer abnormality detection unit 22 determines that there is the abnormality in the sensor 2 to which the identifier [100] is assigned and is output.

When it is determined that there is the abnormality, the transfer abnormality detection unit 22 acquires the notification source ID corresponding to the identifier of the entry that is not executed while referring to the notification source ID conversion table 300, and transmits the state notification packet including the acquired notification source ID to the transfer information selection unit 21. For example, in the above example, since the entry of which the combination of the identifier and the reception time is [100] and [30] is not executed, when the notification source ID conversion table 300 is the example illustrated in FIG. 13, the notification source ID [10] corresponding to the identifier [100] is acquired. Thus, the transfer abnormality detection unit 22 transmits the state notification packet including the notification source ID [10] to the transfer information selection unit 21.

(Operation of Transfer Abnormality Detection Unit 22)

Figure 14:
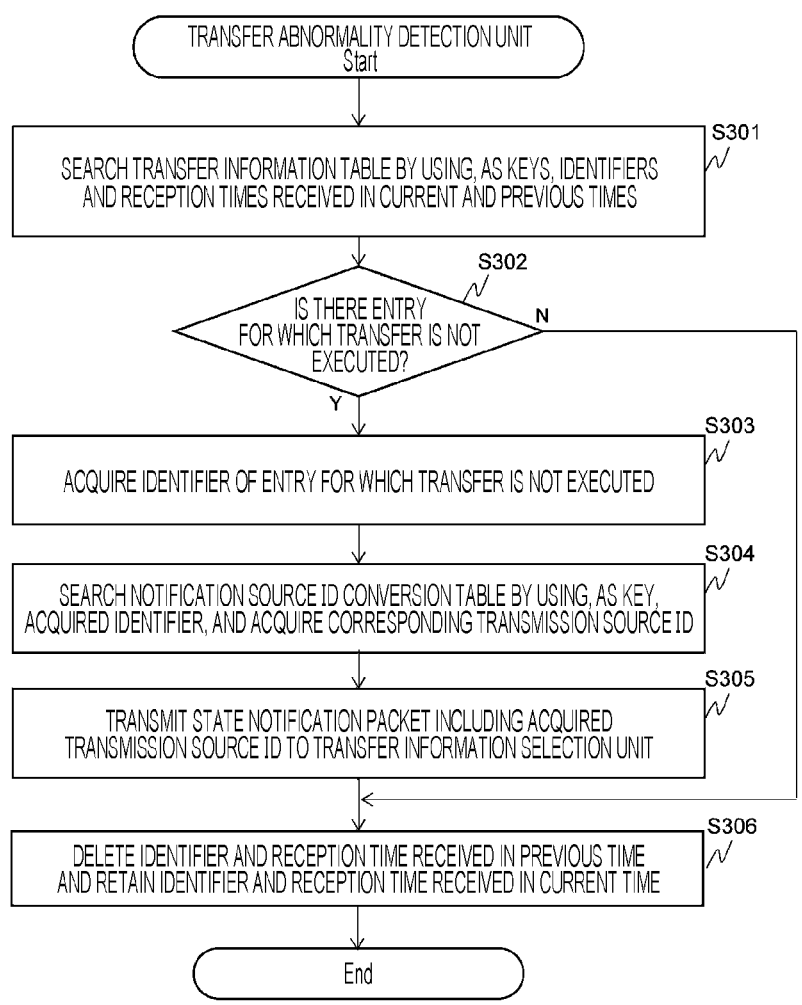
FIG. 14 is a flowchart illustrating an operation of a transfer abnormality detection unit 22.

FIG. 14 is a flowchart illustrating an operation of the transfer abnormality detection unit 22. When the identifier and the reception time are received from the transfer processing unit 20, the transfer abnormality detection unit 22 starts the processing illustrated in FIG. 14. As will be described later, since the received identifier and reception time are retained, the transfer abnormality detection unit 22 retains the identifier and the reception time received in the previous time when the processing illustrated in FIG. 14 is started.

First, the transfer abnormality detection unit 22 searches the initial table in the storage unit 40 by using, as keys, the identifier and the reception time received in the current and previous times (S301). Subsequently, the transfer abnormality detection unit 22 acquires the values of the notification source ID and the state content ID assigned to the packet (S301). Subsequently, the transfer abnormality detection unit 22 determines whether or not there is an entry for which transfer processing is not executed in the transfer processing unit 20 based on the reception time of the entry corresponding to each search key (S302).

Specifically, when there are other entries at a time between the entries corresponding to each search key, it is positively determined in S302 that there is the entry that is not executed, and it is negatively determined that when there are no entries between the entries corresponding to each search key. For example, in the transfer information table 100 illustrated in FIG. 2, when the entry of which the combination of the identifier and the reception time is [100] and [10] and the entry of which the combination of the identifier and the reception time is [100] and [20] are detected, determination is as follows. That is, the times of the searched entries are [10] and [20], and there is the entry of which the time is also [10], but since there is no entry of which the time is between the above times, the determination result in S302 is negative.

The transfer abnormality detection unit 22 proceeds to S303 when it is determined that there is an entry for which the transfer processing is not executed, and proceeds to S306 when it is determined that there is no entry for which the transfer processing is not executed. In S303, the transfer abnormality detection unit 22 acquires the identifier 101 of the entry for which transfer is not executed, and proceeds to S304. In S304, the transfer abnormality detection unit 22 searches the notification source ID conversion table 300 by using the acquired identifier 101 as a key, and acquires the corresponding notification source ID.

The transfer abnormality detection unit 22 transmits the state notification packet including the acquired notification source ID and the state change ID indicating the transfer abnormality to the transfer information selection unit 21 (S305). When the determination result is negative subsequently to S305 or in S302, the transfer abnormality detection unit 22 deletes the identifier and the reception time received in the previous time, retains the time received in the current time (S306), and ends the processing illustrated in FIG. 14.

By the above processing, a case where the scheduled transfer processing is not executed at the reception time indicated by the initial table can be detected as the abnormality of the sensor 2, and the transfer information table 100 as the search target of the transfer processing unit 20 can be changed. In the processing of the present embodiment, for example, when the sensor 2 fails, the data packet 60 from another sensor 2 that reduces the communication rate during the normal operation is increased for the processing logic 3 that executes the information processing for the self-driving determination control, and thus, this processing logic is used when input information is supplemented.

According to the aforementioned third embodiment, the following advantageous effects are obtained.

(5) The transfer processing unit 20 detects the abnormality in the sensor 2 based on the plurality of sensor data packets 60S received consecutively and the initial table. Thus, the abnormality of the sensor 2 can be detected by using the initial table used for determining the transfer.

(Modification Example of Third Embodiment)

It has been described in the above-described third embodiment that the transfer abnormality detection unit 22 detects the abnormality of the sensor 2 based on the two pieces of received data received consecutively and the initial table. However, the transfer abnormality detection unit 22 may detect the abnormality of the sensor 2 based on three or more sensor data packets 60S received consecutively and the initial table. Three or more sensor data packets 60S are used, and thus, it is possible to accurately detect the abnormality of the sensor 2 even though a plurality of entries has the same time in the initial table. More specifically, when there are N entries having the same time in the initial table, N+1 or more sensor data packets 60S received consecutively may be used.

Fourth Embodiment

A fourth embodiment of the data transfer apparatus will be described with reference to FIG. 15. In the following description, the same components as those in the first embodiment are assigned by the same reference signs, and differences will be mainly described. Points not particularly described are the same as those in the second embodiment. The present embodiment is different from the first embodiment in that a reception order is mainly used instead of the reception time. In the present embodiment, a "sequence" and an "order" have the same meaning.

In the present embodiment, the time assigning unit 13 assigns the reception order instead of the time. However, the time assigning unit 13 assigns an independent order according to the identifier included in the data packet 60. For example, the time assigning unit 13 assigns an order "1" to the sensor data packet of which the identifier is "100" which is received first, and assigns an order "2" to the sensor data packet of which the identifier is "100" which is received second.

In the present embodiment, a transfer information table 100A is stored in the storage unit 40 instead of the transfer information table 100. Each entry in the transfer information table 100A includes a reception order 102A instead of the reception time 102 in the transfer information table 100. The reception order 102A is an order assigned to the sensor data packet 60S by the time assigning unit 13. In order to decide the output destination, the transfer processing unit 20 refers to the identifier and the reception time assigned to the time data packet 60T and the transfer information table 100A retained by the storage unit 40.

Figure 15:
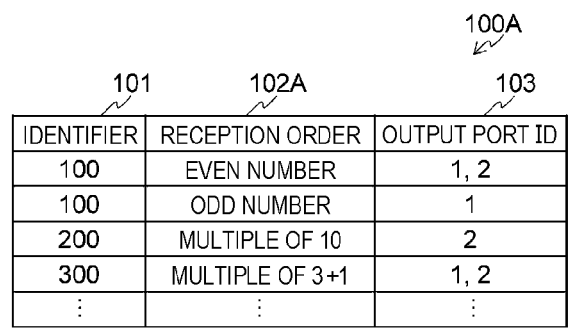
FIG. 15 is a diagram illustrating an example of a transfer information table 100 according to a fourth embodiment.

FIG. 15 is a diagram illustrating an example of the transfer information table 100A. In a field of the reception order 102A, a condition related to the order of the time data packet 60T is stored. The condition related to the order may be a condition that is applicable only to a single order, or may be a condition that is applicable repeatedly. For example, as illustrated in FIG. 15, the condition may be an "even number", an "odd number", or a "multiple of 10". The applicable order may be described as "2N" or "10N" by using a natural number N.

When the transfer information table 100A illustrated in FIG. 15 is referred to, the transfer processing unit 20 outputs the order to the output port ID [1, 2] when the order of the even number is assigned to the time data packet 60T to which the identifier "100" is assigned, and outputs the order to the output port ID [1] when the order of the odd number is assigned.

(Modification Example of Fourth Embodiment)

The sensor 2 may transmit the sensor data packet 60S including information of the order. However, it is assumed that the information of the order assigned by the sensor 2 is independent for each identifier. In this case, the data transfer apparatus 1 does not include the time assigning unit 13, and handles the sensor data packet 60S received from the sensor 2 as the time data packet 60T in the first embodiment. In this case, the transmission processing unit 31 may transmit the information of the order to the processing logic 3 without deleting the order information from the time data packet 60T. In this case, the transfer processing unit 20 may detect the abnormality in the sensor 2 since the information of the order included in the sensor data packet 60S received from the sensor 2 is not continuous.

The aforementioned embodiments and modification examples may be combined with each other. However, the third embodiment and the fourth embodiment cannot be combined. Although various embodiments and modification examples have been described above, the present invention is not limited to these contents. Other aspects considered within the scope of the technical idea of the present invention are also included within the scope of the present invention.

REFERENCE SIGNS LIST

1 data transfer apparatus
2 sensor
3 processing logic
10 acquisition side communication port
11, 32 reception processing unit
12, 31 transmission processing unit
13 time assigning unit
20 transfer processing unit
21 transfer information selection unit
22 transfer abnormality detection unit
30 distribution side communication port
40 storage unit
50 time synchronization processing unit
60 data packet
60S sensor data packet
60T time data packet
100 transfer information table
200 search target information table
300 notification source ID conversion table

The invention claimed is:

1. A data transfer apparatus, comprising:
an acquisition side communication port that receives data including an identifier indicating a classification from an outside;
a distribution side communication port that transmits the data to the outside;
a storage unit that stores predetermined transfer information in which the identifier and a condition related to a time of the data are associated for comparison with received data; and
a transfer processing unit that decides whether or not to transmit received data which is the data to the distribution side communication port based on the identifier included in the received data and information of the time of the received data, and a comparison of the received data and the time of the received data with the predetermined transfer information when the received data is received by the acquisition side communication port,
wherein the information of the time of the received data is a time at which the received data is received by the acquisition side communication port or a time included in the received data.

2. The data transfer apparatus according to claim 1, wherein a plurality of the distribution side communication ports is provided,
the identifier, the condition related to the time of the data, and at least one distribution side communication port are associated with the transfer information, and
the transfer processing unit transmits the received data to the distribution side communication port associated with the identifier included in the received data and the information of the time of the received data.

3. The data transfer apparatus according to claim 1, wherein the storage unit stores a plurality of pieces of the transfer information, and
the transfer processing unit selects any transfer information from among the plurality of pieces of transfer information based on at least one state of a state of the acquisition side communication port, a state of the distribution side communication port, a state of a device connected to the acquisition side communication port, and a state of a device connected to the distribution side communication port, and uses the selected transfer information in the decision related to the received data.

4. The data transfer apparatus according to claim 3, wherein the transfer processing unit receives information regarding the states from the device connected to the acquisition side communication port and the device connected to the distribution side communication port, and determines the states of the device connected to the acquisition side communication port and the device connected to the distribution side communication port.

5. The data transfer apparatus according to claim 3, wherein the transfer processing unit detects an abnormality of the device connected to the acquisition side communication port based on a plurality of pieces of the received data received consecutively and the transfer information.

6. A data transfer method executed by a data transfer apparatus that includes an acquisition side communication port which receives data including an identifier indicating a classification from an outside, a distribution side communication port which transmits the data to the outside, and a storage unit which stores predetermined transfer information in which the identifier and a condition related to a time of the data are associated for comparison with received data, the method comprising:
deciding whether or not to transmit received data which is the data to the distribution side communication port based on the identifier included in the received data and information of the time of the received data, and a comparison of the received data and the time of the received data with the predetermined transfer information when the received data is received by the acquisition side communication port,
wherein the information of the time of the received data is a time at which the received data is received by the acquisition side communication port or a time included in the received data.

7. The data transfer method according to claim 6, wherein a plurality of the distribution side communication ports is provided,
the identifier, the condition related to the time of the data, and at least one distribution side communication port are associated with the transfer information, and
the received data is transmitted to the distribution side communication port associated with the identifier included in the received data and the information of the time of the received data when the received data is transmitted to the distribution side communication port.

8. The data transfer method according to claim 6, wherein the storage unit stores a plurality of pieces of the transfer information, and
the data transfer method further includes selecting any transfer information from among the plurality of pieces of transfer information based on at least one state of a state of the acquisition side communication port, a state of the distribution side communication port, a state of a device connected to the acquisition side communication port, and a state of a device connected to the distribution side communication port, and using the selected transfer information in the decision related to the received data.

9. The data transfer method according to claim 8, further comprising:
receiving information regarding the states from the device connected to the acquisition side communication port and the device connected to the distribution side communication port, and determining the states of the device connected to the acquisition side communication port and the device connected to the distribution side communication port.

10. The data transfer method according to claim 8, further comprising:
detecting an abnormality of the device connected to the acquisition side communication port based on a plurality of pieces of the received data received consecutively and the transfer information.

11. A data transfer apparatus, comprising:
an acquisition side communication port that receives data including an identifier indicating a classification from an outside;
a distribution side communication port that transmits the data to the outside;
a storage unit that stores predetermined transfer information in which the identifier and a condition related to a time of the data are associated for comparison with received data; and
a transfer processing unit that decides whether or not to transmit received data which is the data to the distribution side communication port based on the identifier included in the received data and information of the order of the received data, and a comparison of the received data and the time of the received data with the predetermined transfer information when the received data is received by the acquisition side communication port,
wherein the information of the order of the received data is an order in which the received data is received by the acquisition side communication port or information of the order included in the received data.

12. The data transfer apparatus according to claim 11,
wherein a plurality of the distribution side communication ports is provided,
the identifier, the condition related to the order of the data, and at least one distribution side communication port are associated with the transfer information, and
the transfer processing unit transmits the received data to the distribution side communication port associated with the identifier included in the received data and the information of the order of the received data.

13. The data transfer apparatus according to claim 11,
wherein the storage unit stores a plurality of pieces of the transfer information, and
the transfer processing unit selects any transfer information from among the plurality of pieces of transfer information based on at least one state of a state of the acquisition side communication port, a state of the distribution side communication port, a state of a device connected to the acquisition side communication port, and a state of a device connected to the distribution side communication port, and uses the selected transfer information in the decision related to the received data.

* * * * *